(12) United States Patent
Ryu et al.

(10) Patent No.: US 12,160,856 B2
(45) Date of Patent: Dec. 3, 2024

(54) SIDELINK BEAM FAILURE DETECTION

(71) Applicant: QUALCOMM Incorporated, San Diego, CA (US)

(72) Inventors: Jung Ho Ryu, Fort Lee, NJ (US); Ling Ding, Chester, NJ (US); Sony Akkarakaran, Poway, CA (US); Kiran Venugopal, Green Brook, NJ (US); Tianyang Bai, Mountain View, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/499,335

(22) Filed: Nov. 1, 2023

(65) Prior Publication Data

US 2024/0064726 A1    Feb. 22, 2024

Related U.S. Application Data

(63) Continuation of application No. 17/938,453, filed on Oct. 6, 2022, now Pat. No. 11,838,905, which is a (Continued)

(51) Int. Cl.
*H04W 72/044* (2023.01)
*H04B 7/0408* (2017.01)

(52) U.S. Cl.
CPC ........ *H04W 72/046* (2013.01); *H04B 7/0408* (2013.01)

(58) Field of Classification Search
CPC ....... H04W 92/18; H04W 92/20; H04W 4/40; H04W 4/70
See application file for complete search history.

(56) References Cited

U.S. PATENT DOCUMENTS 10,667,144 B2    5/2020   Xu et al.
11,483,835 B2   10/2022   Ryu et al.
(Continued)

FOREIGN PATENT DOCUMENTS

EP        3726740 A1    10/2020
WO     2019036578 A1     2/2019
(Continued)

OTHER PUBLICATIONS

Interdigital Inc: "Resource Pool Aspects for NR V2X", 3GPP TSG-RAN WG2 Meeting #107, 3GPP Draft; R2-1909588 (R16 V2X WI A1144 Resource Pool Aspects), 3rd Generation Partnership Project (3GPP), Mobile Competence Centre; 650, Route Des Lucioles; F-06921 Sophia-Antipolis Cedex; France, vol. RAN WG2, No. Prague, Czech Republic; Aug. 26, 2019-Aug. 30, 2019, Aug. 16, 2019 (Aug. 16, 2019), pp. 1-5, XP051767383, p. 2, Paragraph 2.

(Continued)

*Primary Examiner* — Fahmida S Chowdhury
(74) *Attorney, Agent, or Firm* — Harrity & Harrity LLP/Qualcomm Incorporated

(57) ABSTRACT

Various aspects of the present disclosure generally relate to wireless communication. In some aspects, a first node may transmit, to a second node on a beamformed link from the first node to the second node, a first signal, wherein the first node and the second node are associated with common timing; determine whether a second signal, based at least in part on the first signal, is received on a beamformed link from the second node to the first node; and transmit a third signal based at least in part on receiving the second signal or perform a sidelink beam failure recovery procedure based at least in part on determining that the second signal is not received. Numerous other aspects are provided.

30 Claims, 10 Drawing Sheets

Related U.S. Application Data continuation of application No. 17/248,162, filed on Jan. 12, 2021, now Pat. No. 11,483,835.

(60) Provisional application No. 62/969,544, filed on Feb. 3, 2020.

(56) References Cited

U.S. PATENT DOCUMENTS

| | | | |
|---|---|---|---|
| 2019/0110281 A1 | 4/2019 | Zhou et al. | |
| 2020/0106566 A1* | 4/2020 | Yeo | H04L 1/1854 |
| 2020/0107236 A1* | 4/2020 | Tseng | H04W 4/50 |
| 2020/0252990 A1* | 8/2020 | Ganesan | H04W 76/14 |
| 2020/0260231 A1* | 8/2020 | Ganesan | H04L 5/0055 |
| 2020/0343951 A1* | 10/2020 | Hou | H04B 1/44 |
| 2021/0022127 A1* | 1/2021 | Xu | H04W 72/20 |
| 2021/0092789 A1* | 3/2021 | Basu Mallick | H04W 76/18 |
| 2021/0100059 A1* | 4/2021 | Xu | H04B 7/06954 |
| 2021/0243748 A1 | 8/2021 | Ryu et al. | |
| 2023/0036526 A1 | 2/2023 | Ryu et al. | |

FOREIGN PATENT DOCUMENTS

| | | |
|---|---|---|
| WO | 2019147711 | 8/2019 |
| WO | 2019174532 A1 | 9/2019 |

OTHER PUBLICATIONS

International Preliminary Report On Patentability—PCT/US2021/070027—The International Bureau of WIPO—Geneva, Switzerland—Aug. 18, 2022.

International Search Report and Written Opinion—PCT/US2021/070027—ISA/EPO—Apr. 1, 2021.

* cited by examiner

SIDELINK BEAM FAILURE DETECTION

CROSS-REFERENCE TO RELATED APPLICATIONS

This application is a continuation of U.S. patent application Ser. No. 17/938,453, filed Oct. 6, 2022, entitled "SIDELINK BEAM FAILURE DETECTION," which is a continuation of U.S. patent application Ser. No. 17/248,162, filed Jan. 12, 2021 (now U.S. Pat. No. 11,483,835), entitled "SIDELINK BEAM FAILURE DETECTION," which claims priority to U.S. Provisional Patent Application No. 62/969,544, filed on Feb. 3, 2020, entitled "SIDELINK BEAM FAILURE DETECTION," the contents of which are incorporated herein by reference in their entireties.

FIELD OF THE DISCLOSURE

Aspects of the present disclosure generally relate to wireless communication and to techniques and apparatuses for sidelink beam failure detection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BS s) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first node, may include transmitting, to a second node on a beamformed link from the first node to the second node, a first signal, wherein the first node and the second node are associated with common timing; determining whether a second signal, based at least in part on the first signal, is received on a beamformed link from the second node to the first node; and transmitting a third signal on the beamformed link from the first node to the second node based at least in part on receiving the second signal, or performing a sidelink beam failure recovery procedure based at least in part on determining that the second signal is not received.

In some aspects, a method of wireless communication, performed by a second node, may include determining whether a first signal is received from a first node on a beamformed link from the first node to the second node, wherein the first node and the second node are associated with common timing; determining whether to transmit, on a beamformed link from the second node to the first node, a second signal based at least in part on whether the first signal is received; and receiving a third signal based at least in part on the second signal, or performing a sidelink beam failure recovery procedure based at least in part on failing to receive the first signal or the third signal.

In some aspects, a first node for wireless communication may include a memory and one or more processors operatively coupled to the memory. The memory and the one or more processors may be configured to transmit, to a second node on a beamformed link from the first node to the second node, a first signal, wherein the first node and the second node are associated with common timing; determine whether a second signal, based at least in part on the first signal, is received on a beamformed link from the second node to the first node; and transmit a third signal based at least in part on receiving the second signal, or perform a sidelink beam failure recovery procedure based at least in part on determining that the second signal is not received.

In some aspects, a second node for wireless communication may include a memory and one or more processors operatively coupled to the memory. The memory and the one or more processors may be configured to determine whether a first signal is received from a first node on a beamformed link from the first node to the second node, wherein the first node and the second node are associated with common timing; determine whether to transmit, on a beamformed link from the second node to the first node, a second signal based at least in part on whether the first signal is received; and receive a third signal based at least in part on the second signal, or perform a sidelink beam failure recovery procedure based at least in part on failing to receive the first signal or the third signal.

In some aspects, a non-transitory computer-readable medium may store one or more instructions for wireless communication. The one or more instructions, when executed by one or more processors of a first node, may cause the one or more processors to transmit, to a second node on a beamformed link from the first node to the second node, a first signal, wherein the first node and the second node are associated with common timing; determine whether a second signal, based at least in part on the first signal, is received on a beamformed link from the second node to the first node; and transmit a third signal based at least in part on receiving the second signal, or perform a sidelink beam failure recovery procedure based at least in part on determining that the second signal is not received.

In some aspects, a non-transitory computer-readable medium may store one or more instructions for wireless communication. The one or more instructions, when executed by one or more processors of a second node, may cause the one or more processors to determine whether a first signal is received from a first node on a beamformed link from the first node to the second node, wherein the first node and the second node are associated with common timing; determine whether to transmit, on a beamformed link from the second node to the first node, a second signal based at least in part on whether the first signal is received; and receive a third signal based at least in part on the second signal, or perform a sidelink beam failure recovery procedure based at least in part on failing to receive the first signal or the third signal.

In some aspects, an apparatus for wireless communication may include means for transmitting, to a second node on a beamformed link from the apparatus to the second node, a first signal, wherein the apparatus and the second node are associated with common timing; means for determining whether a second signal, based at least in part on the first signal, is received on a beamformed link from the second node to the apparatus; and means for transmitting a third signal on the beamformed link from the first node to the second node based at least in part on receiving the second signal or performing a sidelink beam failure recovery procedure based at least in part on determining that the second signal is not received.

In some aspects, an apparatus for wireless communication may include means for determining whether a first signal is received from a first node on a beamformed link from the first node to the apparatus, wherein the first node and the apparatus are associated with common timing; means for determining whether to transmit, on a beamformed link from the apparatus to the first node, a second signal based at least in part on whether the first signal is received; and means for receiving a third signal based at least in part on the second signal; or means for performing a sidelink beam failure recovery procedure based at least in part on failing to receive the first signal or the third signal.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
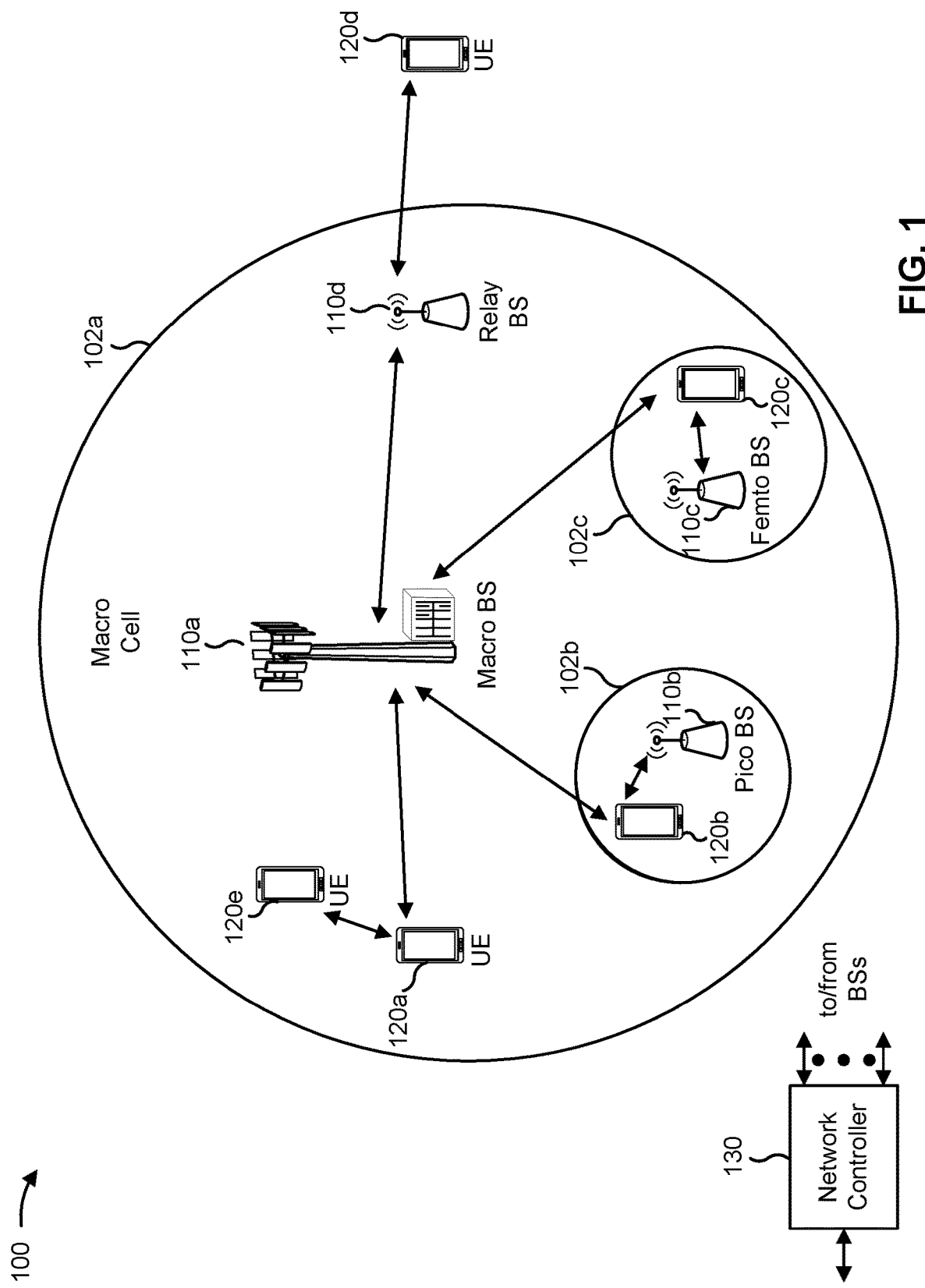
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
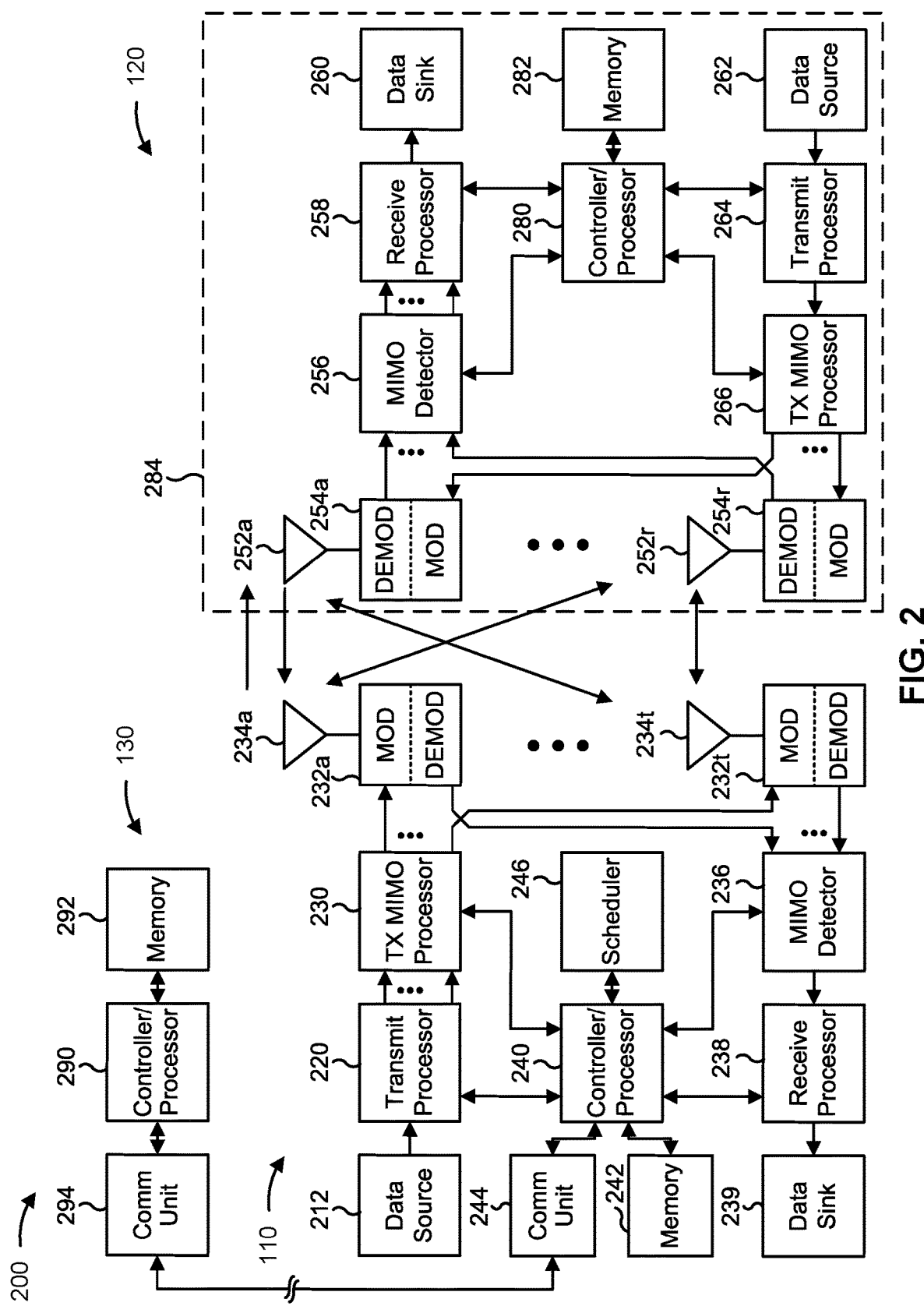
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink beam failure detection, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, and/or other processes as described herein. A scheduler 246 may schedule UEs for data transmission on the downlink and/or uplink.

In some aspects, a node (e.g., UE 120 or BS 110) may include means for transmitting, to a second node on a beamformed link from the first node to the second node, a first signal; means for determining whether a second signal, based at least in part on the first signal, is received on a beamformed link from the second node to the first node; means for transmitting a third signal on the beamformed link from the first node to the second node based at least in part on receiving the second signal; means for performing a sidelink beam failure recovery procedure based at least in part on determining that the second signal is not received; means for determining whether a first signal is received from a first node on a beamformed link from the first node to the second node; means for determining whether to transmit, on a beamformed link from the second node to the first node, a second signal based at least in part on whether the first signal is received; means for receiving a third signal based at least in part on the second signal; means for performing a sidelink beam failure recovery procedure based at least in part on failing to receive the first signal or the third signal; means for performing the sidelink beam failure recovery procedure based at least in part on failing to receive one or more of the first signal or the third signal a threshold number of times; and/or the like. In some aspects, such means may include one or more components of UE 120 or BS 110 described in connection with FIG. 2, such as controller/processor 280, transmit processor 264, TX MIMO processor 266, MOD 254, antenna 252, DEMOD 254, MIMO detector 256, receive processor 258, antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
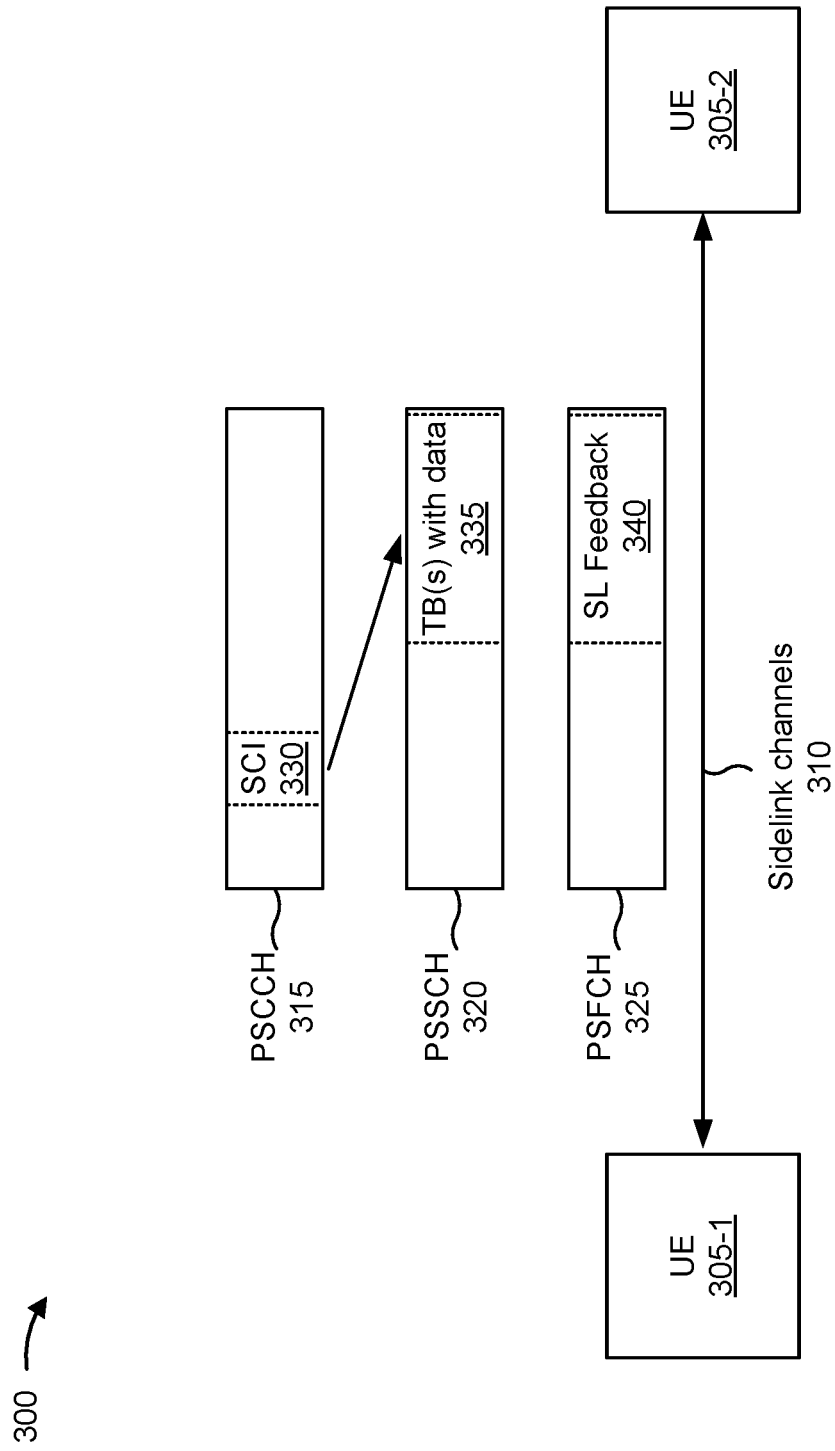
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a ProSe sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing or timing of a base station 110 associated with one or more of the UEs 305.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TB s 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
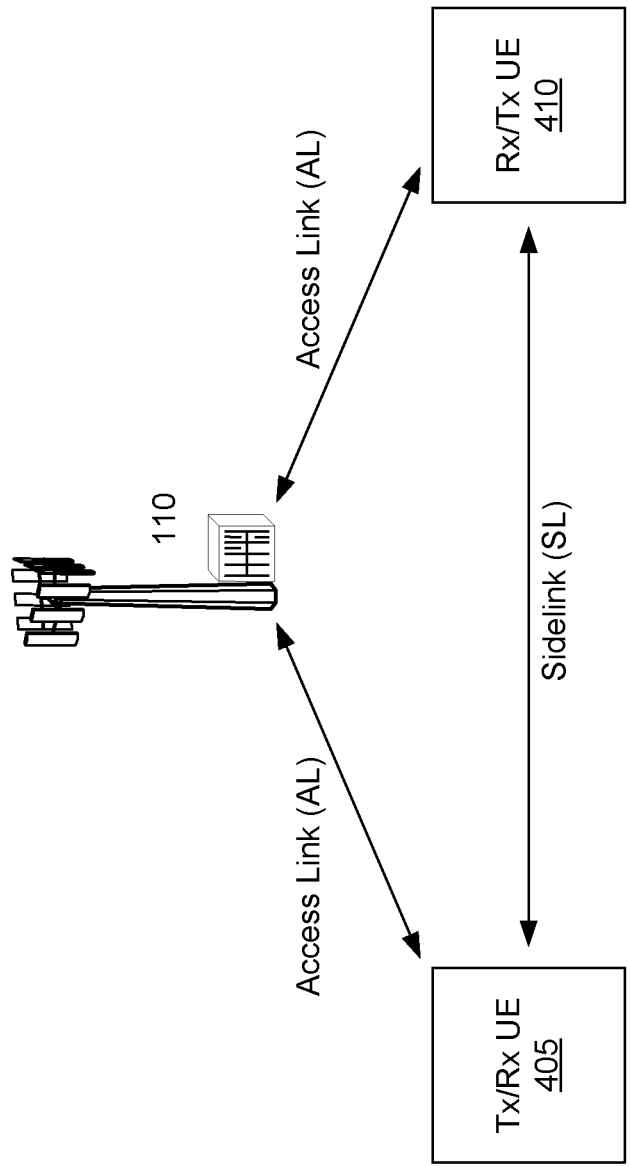
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a sidelink may refer to a direct link between UEs 120, and an access link may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110). In some aspects, the UEs 405 and 410 may not be associated with an access link.

As indicated above, FIG. 4 is provided as an example. Other examples may differ from what is described with respect to FIG. 4.

Two nodes may communicate with each other using sidelink communications. A node may be any UE, such as an integrated access and backhaul (IAB) node, a UE associated with vehicular communications, a UE associated with a sidelink network, a reduced capability UE, or the like. A sidelink communication involves the transmission or reception of data between the UEs without an intermediary base station or scheduling entity and without communication of the data via an access link. Sidelink communications may be useful in various applications, such as low-latency scenarios, poor coverage scenarios, UE-to-network or network-to-UE relaying, vehicle-to-anything communication, vehicle-to-vehicle communication, and so on. Nodes may use beamforming to communicate with each other on the sidelink, which may improve radio performance of the nodes while using less power than an omni-directional or pseudo-omni-directional transmission with equivalent range.

In some cases, a beam on a beamformed sidelink may fail, meaning that the beam no longer provides a link to another node. For example, a blocker may move into the propagation path of the beam, or the node transmitting or receiving the beam may move, thereby causing failure of the sidelink. In this case, the beamformed sidelink may experience diminished performance or may fail. This may lead to interrupted communications, wasted resources, diminished throughput, and so on. Furthermore, detecting a failed beam on a sidelink in an expeditious fashion may be difficult if there is no central scheduler associated with the sidelink to arrange the transmission of signals or beam failure recovery on the sidelink.

Some techniques and apparatuses described herein provide for a pair of nodes to perform beam failure detection and recovery on a sidelink between the pair of nodes. For example, a pair of nodes associated with common timing may transmit signals between each other on resource allocations known to the pair of nodes. The pair of nodes may identify a healthy link or a failed beam or link based at least in part on whether the signals are received on the allocated resources, and may perform beam failure recovery (BFR) based at least in part on detecting a failed beam or link. In this way, the pair of nodes can identify beam failure and perform BFR on a sidelink without the participation of a central scheduler such as a gNB. Identifying beam failure and performing BFR on the sidelink without the participation of the central scheduler may reduce the impact of blocked beams, thereby improving radio link quality, throughput, and resource utilization while reducing latency and overhead associated with identifying failure of a beam or a sidelink.

FIGS. 5-8 are diagrams illustrating examples 500, 600, 700, and 800 of sidelink beam failure detection and recovery, in accordance with various aspects of the present disclosure. Examples 500, 600, 700, and 800 include a first UE 120 and a second UE 120 (e.g., UE 305-1, UE 305-2, UE 405, UE 410, and/or the like), which are referred to as the first UE and the second UE. In some aspects, the first UE may be a first node and the second UE may be a second node. In some aspects, the first UE and/or the second UE may be associated with an access link to a BS 110. In some aspects, the first UE and the second UE may not be associated with access links to a BS 110. While the operations described in FIGS. 5-8 are described as being performed by a first UE and a second UE, these operations can be performed by other types of wireless nodes (e.g., IAB nodes and/or the like).

Figure 5:
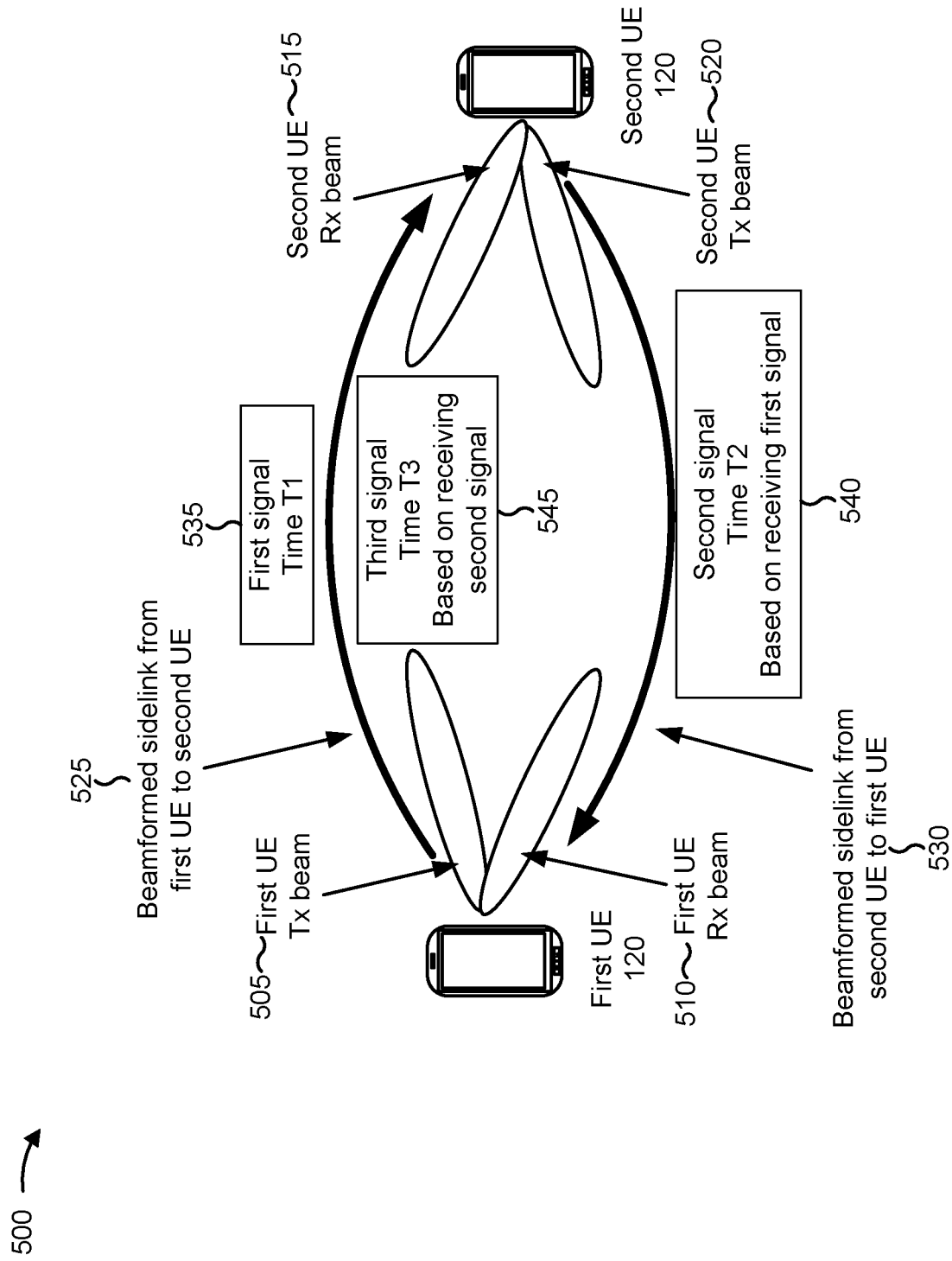
FIGS. 5-8 are diagrams illustrating examples of sidelink beam failure detection and recovery, in accordance with various aspects of the present disclosure.
Figure 8:
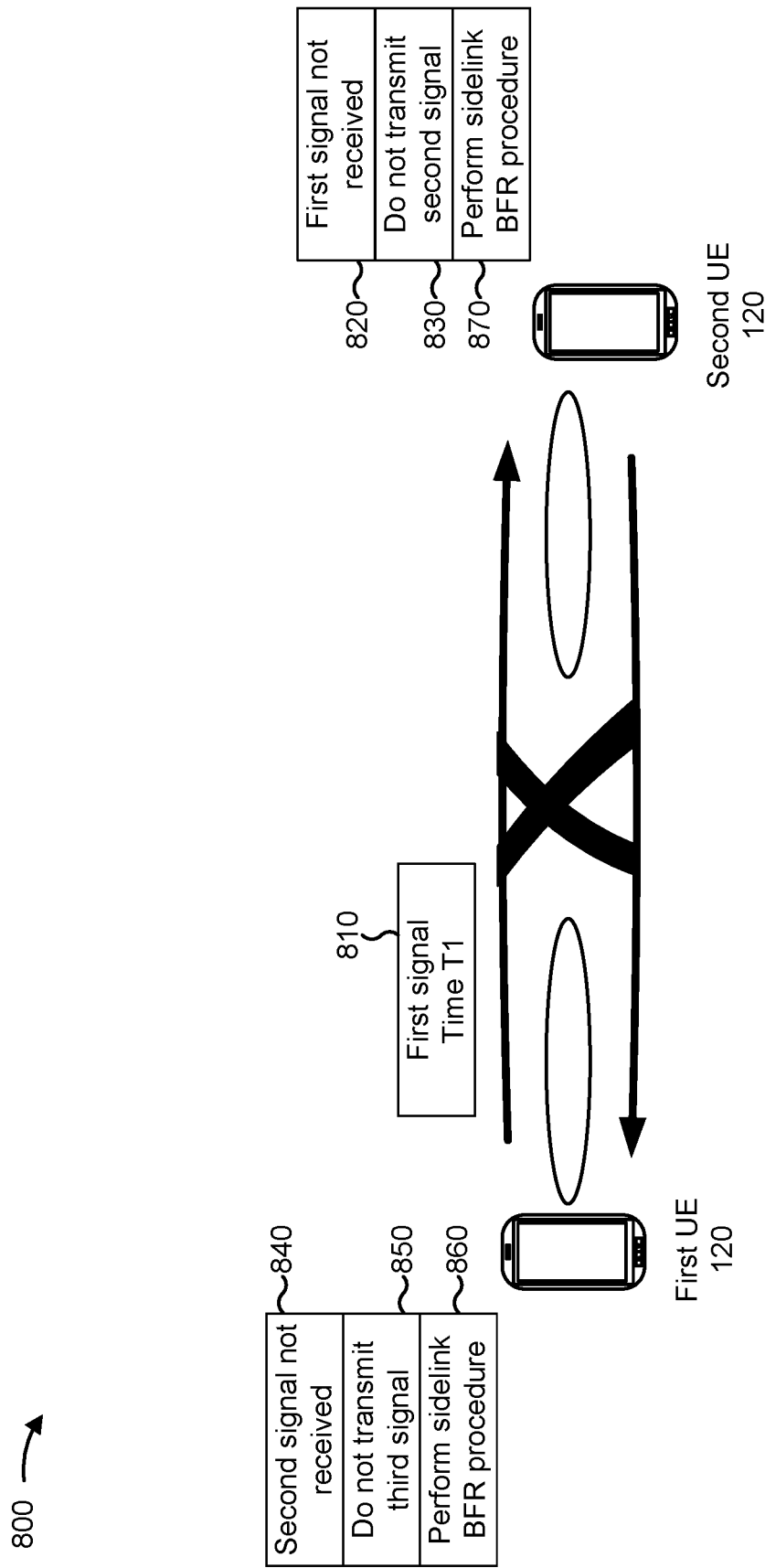

FIG. 5 shows an example 500 of sidelink beam monitoring on an intact sidelink. As shown, the first UE may be associated with a transmit (Tx) beam 505 and a receive (Rx) beam 510. The second UE may be associated with an Rx beam 515 corresponding to the Tx beam 505 and a Tx beam 520 corresponding to the Rx beam 510. The Tx beam 505 and the Rx beam 515 may form a beamformed sidelink 525 from the first UE to the second UE, and the Tx beam 520 and the Rx beam 510 may form a beamformed sidelink 530 from the second UE to the first UE. For example, the beamformed sidelinks 525 and 530 may carry sidelink channels 310 (shown in FIG. 3) between the first UE and the second UE. In some aspects, the first UE and the second UE may be associated with a single beamformed sidelink that can be used for communicating in both directions, which is shown in FIG. 8.

As shown by reference number 535, the first UE may transmit a first signal at a time T1. For example, the first UE may transmit the first signal on a resource allocation (e.g., a time and/or frequency resource allocation) known to the first UE and the second UE, wherein the resource allocation is associated with the time T1. The first UE and the second UE may be associated with common timing, meaning that the second UE can determine the time T1 at which the UE transmits the first signal. For example, in some aspects, the first UE and the second UE may have common timing based at least in part on being configured with common timing by a base station (e.g., via an access link). In some aspects, the first UE and the second UE may have common timing based at least in part on respective positioning systems (e.g., Global Positioning System (GPS), Global Navigation Satellite System (GNSS), or the like) of the first UE and the second UE. By establishing common timing, the second UE can determine when to expect the first signal (and the first UE can determine when to expect the second signal) thereby enabling sidelink beam monitoring using the first signal, the second signal, and the third signal.

In some aspects, the first UE and the second UE may determine T1, T2, and/or T3. For example, the first UE and the second UE may communicate with each other to identify (e.g., determine) resource allocations for transmission/reception of the first signal, the second signal, and the third signal, which may eliminate the need for participation from a scheduling entity, thereby conserving computing resources of the scheduling entity. In some aspects, the first UE and the second UE may be configured with information indicating T1, T2, and/or T3. For example, this information may be specified in a wireless telecommunication standard, which may conserve signaling resources of the UEs and a BS 110 associated with the UEs. In some aspects, the first UE and the second UE may receive (e.g., from a scheduling entity such as a BS 110) information indicating T1, T2, and/or T3, which may conserve resources of the first UE and the second UE that would otherwise be used to determine T1, T2, and/or T3.

As shown by reference number 540, the second UE may transmit, on the beamformed sidelink 530, a second signal. For example, the second UE may transmit the second signal at a time T2 (e.g., using a resource allocation associated with the time T2 and known to the first UE and the second UE) based at least in part on receiving the first signal on the resource allocation associated with the time T1. In some aspects, T2 may be offset from T1 by a length of time (e.g., approximately 10 ms and/or the like), which may be configurable, predefined, negotiated by the first UE and the second UE, or the like. As shown by reference number 545, the first UE may transmit, on the beamformed sidelink 525, a third signal. For example, the first UE may transmit the third signal at a time T3 (e.g., using a resource allocation known to the first UE and the second UE and associated with the time T3) based at least in part on receiving the second signal on the resource allocation associated with the time T2. In some aspects, T3 may be offset from T2 by a length of time (e.g., approximately 10 ms and/or the like), which may be configurable, predefined, negotiated by the first UE and the second UE, or the like.

By transmitting the second signal based at least in part on receiving the first signal, and the third signal based at least in part on receiving the second signal, the first UE and the second UE may determine whether or not the beamformed sidelink 525 and the beamformed sidelink 530 have failed. For examples of failure of the beamformed sidelink 525 and/or the beamformed sidelink 530, refer to FIGS. 6-8. The first signal, the second signal, and/or the third signal may comprise any form of signaling, such as a reference signal (RS) (e.g., a channel state information (CSI) RS (CSI-RS), a sounding reference signal, or the like), a physical sidelink control channel (PSCCH), a physical sidelink shared channel (PSSCH), a physical sidelink feedback channel (PSFCH), and/or the like. The first signal, the second signal, and the third signal may all be the same type of signal or may include two or more different types of signals.

Performing sidelink beam failure detection using the first signal, the second signal, and the third signal may involve lower overhead than some other sidelink beam failure detection procedures. For example, in some cases, a first UE may transmit a beacon (e.g., a signal such as a synchronization signal block and/or the like) on a beamformed sidelink, and a second UE may report to a base station 110 regarding whether the beacon is received. The base station 110 may coordinate beam failure recovery when the beacon is not received by the second UE. However, base station coordination of monitoring and beam failure recovery may involve significant overhead and latency and may be difficult or impossible in poor access network coverage scenarios. As another example, in some cases, a first UE may transmit a beacon on a beamformed sidelink, and a second UE may initiate a random access channel (RACH) procedure on the beamformed sidelink when the beacon is not received. However, the RACH-based sidelink beam failure detection procedure may require that the first UE and the second UE maintain RACH resources on an ongoing basis, which may be more resource-intensive than maintaining resources for the first signal, the second signal, and the third signal.

Figure 6:
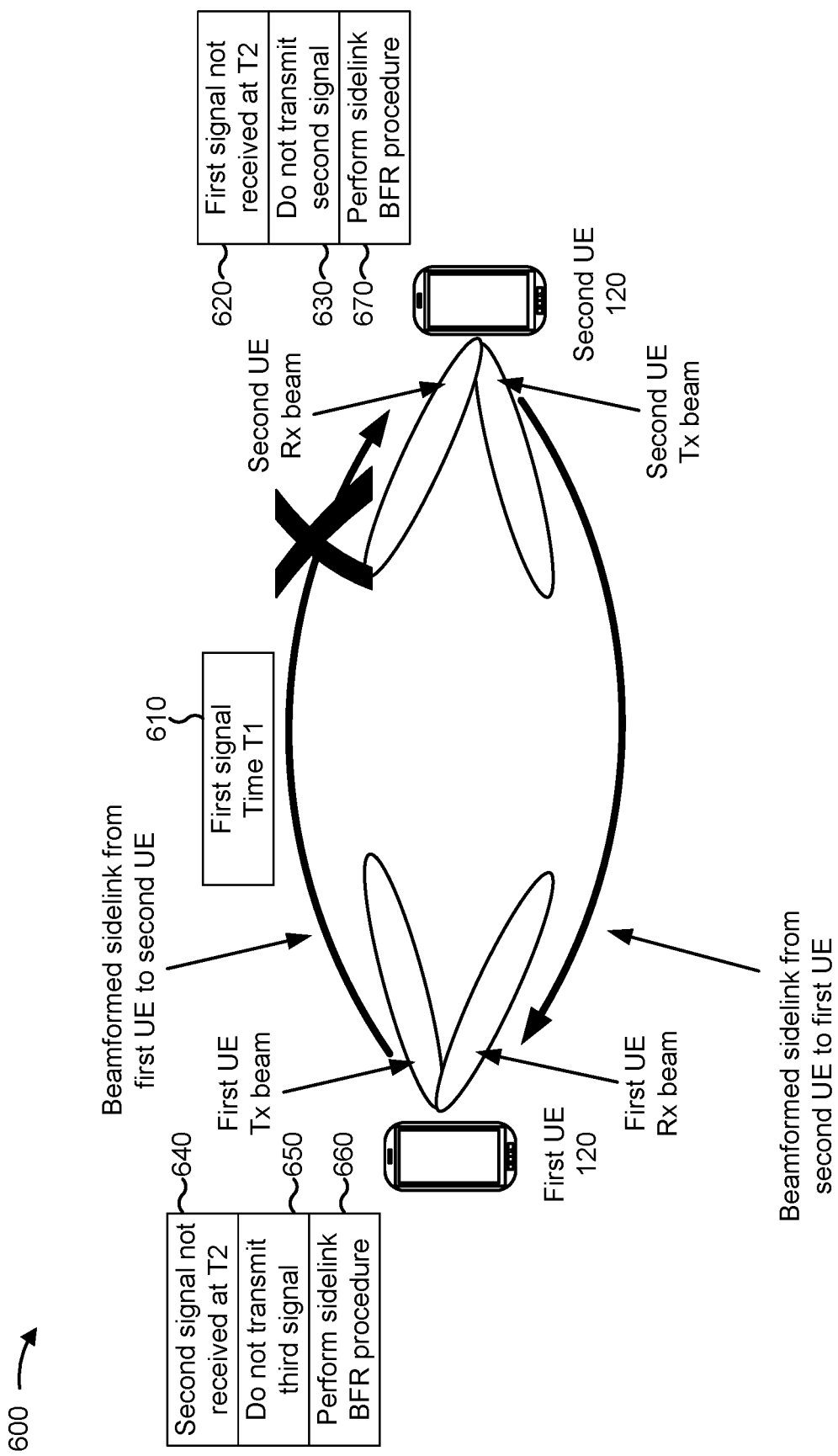

FIG. 6 shows an example 600 in which the beamformed sidelink from the first UE to the second UE has failed, as shown by the "X" on the beamformed sidelink from the first UE to the second UE. As shown by reference number 610, the first UE may transmit the first signal at the time T1. As shown by reference number 620, the second UE may determine that the first signal is not received within a threshold time of T1. Accordingly, as shown by reference number 630, the second UE may not transmit the second signal. As shown by reference number 640, the first UE may determine that the second signal is not received at the time T2. This may indicate, to the first UE, that transmission of the first signal and/or the second signal has failed, meaning that one or more of the beamformed sidelinks between the first UE and the second UE has failed. Accordingly, as shown by reference number 650, the first UE may not transmit the third signal at the time T3.

As shown by reference numbers 660 and 670, the first UE and the second UE may perform a sidelink BFR procedure based at least in part on determining that the first signal, the second signal, and/or the third signal are not received. In some aspects, the first UE and the second UE may perform the sidelink BFR procedure based at least in part on determining that the first signal and the second signal are not received, which may reduce the latency associated with performing the sidelink BFR procedure relative to the case when the sidelink BFR procedure is performed after determining that the third signal is not received.

In the sidelink BFR procedure, the first UE may transmit beam failure recovery synchronization signals on multiple Tx beams at predetermined time/frequency locations (e.g., resource allocations) known to the first UE and the second UE. The second UE may receive the beam failure recovery synchronization signals on multiple Rx beams. Based at least in part on receiving the beam failure recovery synchronization signals over multiple Tx-Rx beam combinations, the second UE may determine the best Tx beam to be used by the first UE and the best Rx beam to be used by the second UE for the beamformed sidelink from the first UE to the second UE. The second UE may use this information to transmit a RACH signal to the first UE. For example, the RACH signal may use resources that are configured as part of the sidelink BFR procedure. The first UE may receive potential beam failure recovery RACH signals from the second UE at predetermined time/frequency locations known to both UEs (e.g., the RACH resources). The second UE may transmit the RACH signal at a time when the first UE is using the Rx beam corresponding to the best Tx beam that the first UE used to transmit the synchronization signal. Upon receiving the RACH signal, the first UE may determine a best Tx beam for the beamformed sidelink from the first UE to the second UE. This sidelink BFR procedure may be initiated based at least in part on failing to detect the first, second, and/or third signals (e.g., without intervention from a base station). It should also be noted that the roles of the first UE and the second UE in the sidelink BFR procedure can be reversed (e.g., the first UE can perform the RACH procedure and the second UE can transmit the synchronization signals) in order to establish the beamformed link from the second UE to the first UE.

In some aspects, the first UE and/or the second UE may determine beam failure based at least in part on failing to receive a threshold number of signals. For example, the first UE and/or the second UE may declare beam failure upon failing to receive N first/second/third signals, or upon determining that the procedure of receiving and transmitting the first/second/third signals has failed N times, where N is an integer. This may conserve computing and communication resources that would otherwise be used to premature trigger the sidelink BFR procedure due to a single failed signal transmission.

Figure 7:
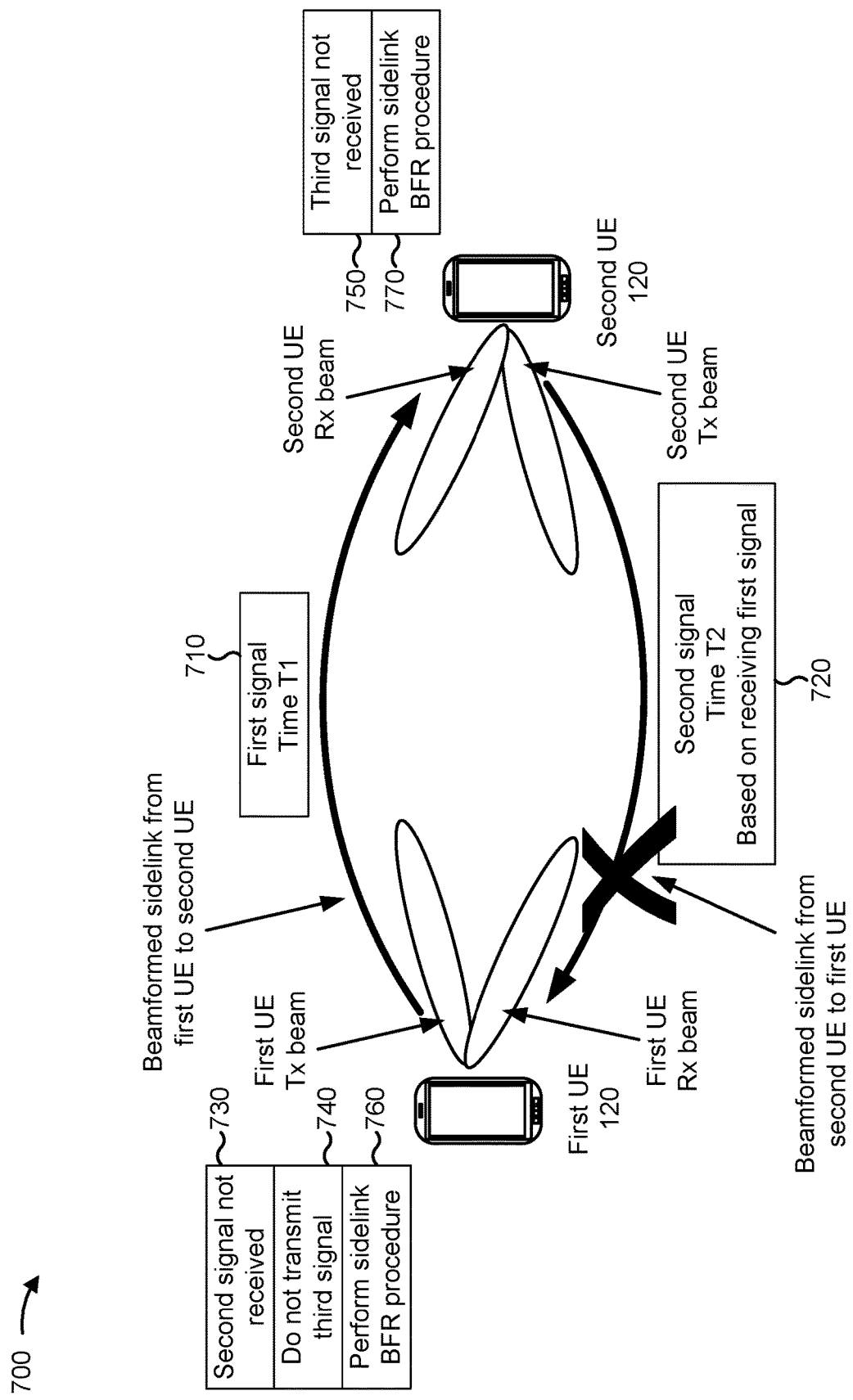

FIG. 7 shows an example 700 in which the beamformed sidelink from the second UE to the first UE has failed, as shown by the "X" on the beamformed sidelink from the second UE to the first UE. As shown by reference number 710, the first UE may transmit the first signal at the time T1. As shown by reference number 720, the second UE may transmit the second signal at the time T2, based at least in part on successfully receiving the first signal at the time T1. However, the first UE fails to receive the second signal, as shown by reference number 730. Accordingly, the first UE determines that the third signal is not to be transmitted to the second UE, as shown by reference number 740. The second UE may determine that the third signal is not received at the time T3. Thus, the first UE and the second UE may determine that one or more beamformed sidelinks between the second UE and the first UE have failed, since the second UE successfully received the first signal and not the third signal, and since the first UE did not receive the second signal. Thus, as shown by reference numbers 760 and 770, the first UE and the second UE may perform a sidelink BFR procedure, such as the sidelink BFR procedure described in connection with FIG. 6.

The case when both beamformed sidelinks fail may be similar to the examples 600 and 700, since the first UE and the second UE may determine that the third and second signals are not to be transmitted based at least in part on failing to receive the second and first signals, respectively.

FIG. 8 shows an example 800 in which a single beamformed sidelink between the second UE to the first UE is used. For example, the single beamformed sidelink may be a full duplex sidelink using some form of duplexing or can be used to communicate in both directions. In example 800, the beamformed sidelink has failed, as shown by the "X" on the beamformed sidelink between the second UE and the first UE. Thus, the first signal shown by reference number 810 is not received by the second UE, as shown by reference number 820. Accordingly, the second UE determines not to transmit the second signal, as shown by reference number 830. The first UE may determine that the second signal is not received at the time T2, as shown by reference number 840, and may determine that the third signal is not to be transmitted, as shown by reference number 850. As shown by reference numbers 860 and 870, the first UE and the second UE may perform a sidelink BFR procedure based at least in part on determining that the beamformed sidelink has failed, such as the sidelink BFR procedure described in connection with FIG. 6.

As indicated above, FIGS. 5-8 are provided as one or more examples. Other examples may differ from what is described with respect to FIGS. 5-8.

Figure 9:
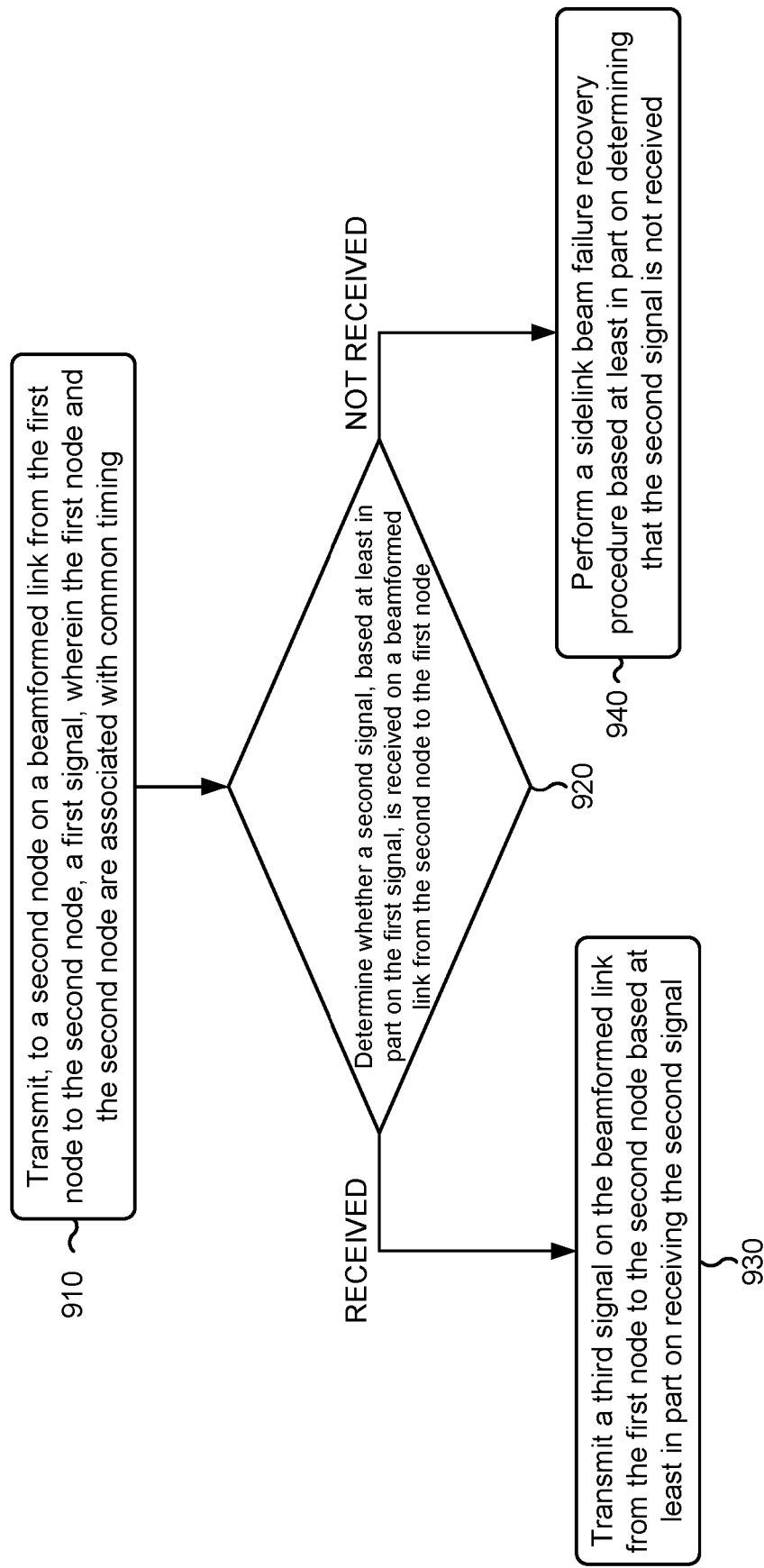
FIGS. 9 and 10 are diagrams illustrating example processes performed, for example, by a user equipment, in accordance with various aspects of the present disclosure.

FIG. 9 is a diagram illustrating an example process 900 performed, for example, by a first node, in accordance with various aspects of the present disclosure. Example process 900 is an example where the first node (e.g., UE 120, BS 110, UE 305, UE 405, UE 410, first UE 120 of FIGS. 5-8, and/or the like) performs operations associated with sidelink beam failure detection.

As shown in FIG. 9, in some aspects, process 900 may include transmitting, to a second node on a beamformed link from the first node to the second node, a first signal, wherein the first node and the second node are associated with common timing (block 910). For example, the first node (e.g., using controller/processor 280, transmit processor 264, TX MIMO processor 266, MOD 254, antenna 252, controller/processor 240, transmit processor 220, TX MIMO processor 230, MOD 232, antenna 234, and/or the like) may transmit, to a second node on a beamformed link from the first node to the second node, a first signal, as described above. In some aspects, the first node and the second node are associated with common timing.

As further shown in FIG. 9, in some aspects, process 900 may include determining whether a second signal, based at least in part on the first signal, is received on a beamformed link from the second node to the first node (block 920). For example, the first node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may determine whether a second signal, based at least in part on the first signal, is received on a beamformed link from the second node to the first node, as described above.

As further shown in FIG. 9, in some aspects, process 900 may include transmitting a third signal on the beamformed link from the first node to the second node based at least in part on receiving the second signal (block 930). For example, the first node (e.g., using controller/processor 280, transmit processor 264, TX MIMO processor 266, MOD 254, antenna 252, controller/processor 240, transmit processor 220, TX MIMO processor 230, MOD 232, antenna 234, and/or the like) may transmit a third signal based at least in part on receiving the second signal, as described above.

As further shown in FIG. 9, in some aspects, process 900 may include performing a sidelink beam failure recovery procedure based at least in part on determining that the second signal is not received (block 940). For example, the first node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may perform a sidelink beam failure recovery procedure based at least in part on determining that the second signal is not received, as described above.

Process 900 may include additional aspects, such as any single aspect or any combination of aspects described below and/or in connection with one or more other processes described elsewhere herein.

In a first aspect, at least one of the first signal, the second signal, or the third signal comprise channel state information reference signals.

In a second aspect, alone or in combination with the first aspect, the first signal, the second signal, and the third signal are associated with respective resource allocations that are known to the first node and the second node before transmission of the first signal.

In a third aspect, alone or in combination with one or more of the first and second aspects, the respective resource allocations are determined by one or more of the first node or the second node.

In a fourth aspect, alone or in combination with one or more of the first through third aspects, the respective resource allocations are determined by a base station associated with the first node or the second node.

In a fifth aspect, alone or in combination with one or more of the first through fourth aspects, the beamformed link from the first node to the second node and the beamformed link from the second node to the first node are a same link.

In a sixth aspect, alone or in combination with one or more of the first through fifth aspects, the common timing is determined based at least in part on a base station associated with the first node and the second node.

In a seventh aspect, alone or in combination with one or more of the first through sixth aspects, the common timing is determined based at least in part on positioning systems of the first node and the second node.

In an eighth aspect, alone or in combination with one or more of the first through seventh aspects, the beamformed link from the first node to the second node and the beamformed link from the second node to the first node are associated with a ProSe sidelink interface.

In a ninth aspect, alone or in combination with one or more of the first through eighth aspects, the first node and the second node comprise user equipment.

In a tenth aspect, alone or in combination with one or more of the first through ninth aspects, the first node and the second node comprise integrated access and backhaul nodes.

In an eleventh aspect, alone or in combination with one or more of the first through tenth aspects, performing the sidelink beam failure recovery procedure further comprises performing the sidelink beam failure recovery procedure based at least in part on failing to receive the second signal a threshold number of times.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
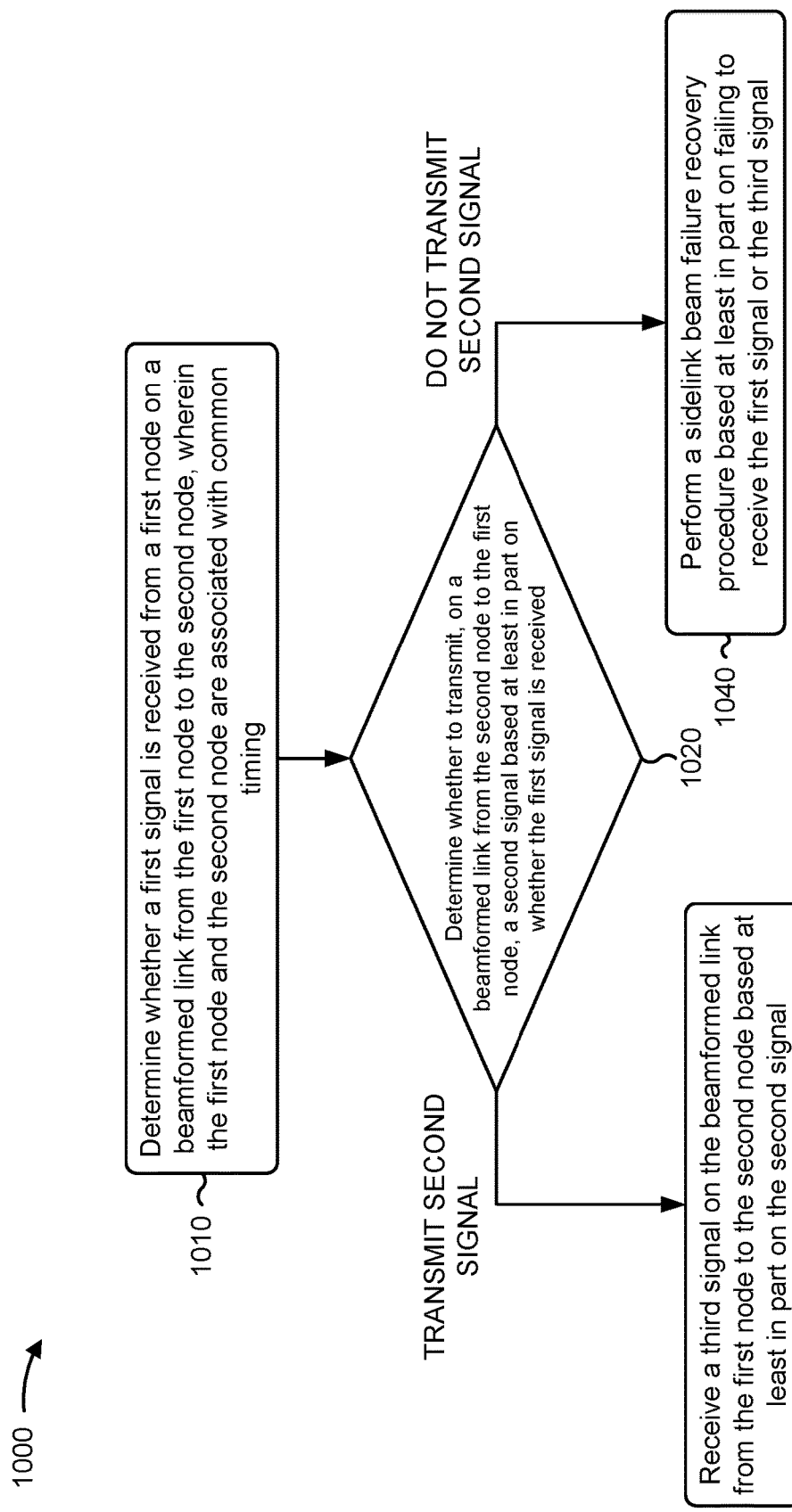

FIG. 10 is a diagram illustrating an example process 1000 performed, for example, by a second node, in accordance with various aspects of the present disclosure. Example process 1000 is an example where the second node (e.g., UE 120, BS 110, UE 305, UE 405, UE 410, second UE 120 of FIGS. 5-8, and/or the like) performs operations associated with sidelink beam failure detection.

As shown in FIG. 10, in some aspects, process 1000 may include determining whether a first signal is received from a first node on a beamformed link from the first node to the second node, wherein the first node and the second node are associated with common timing (block 1010). For example, the second node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may determine whether a first signal is received from a first node on a beamformed link from the first node to the second node, as described above. In some aspects, the first node and the second node are associated with common timing.

As further shown in FIG. 10, in some aspects, process 1000 may include determining whether to transmit, on a beamformed link from the second node to the first node, a second signal based at least in part on whether the first signal is received (block 1020). For example, the second node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may determine whether to transmit, on a beamformed link from the second node to the first node, a second signal based at least in part on whether the first signal is received, as described above.

As further shown in FIG. 10, in some aspects, process 1000 may include receiving a third signal on the beamformed link from the first node to the second node based at least in part on the second signal (block 1030). For example, the second node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive a third signal based at least in part on the second signal, as described above. In some aspects, the second node may receive the third signal after transmitting the second signal.

As further shown in FIG. 10, in some aspects, process 1000 may include performing a sidelink beam failure recovery procedure based at least in part on failing to receive the first signal or the third signal (block 1040). For example, the second node (e.g., using antenna 234, DEMOD 232, MIMO detector 236, receive processor 238, controller/processor 240, antenna 252, DEMOD 254, MIMO detector 256, receive processor 258, controller/processor 280, and/or the like) may perform a sidelink beam failure recovery procedure based at least in part on failing to receive the first signal or the third signal, as described above. In some aspects, the second node may perform a sidelink beam failure recovery procedure after determining that the second signal is not to be transmitted.

Process 1000 may include additional aspects, such as any single aspect or any combination of aspects described below and/or in connection with one or more other processes described elsewhere herein.

In a first aspect, process 1000 includes transmitting the second signal based at least in part on receiving the first signal.

In a second aspect, alone or in combination with the first aspect, at least one of the first signal, the second signal, or the third signal comprise channel state information reference signals.

In a third aspect, alone or in combination with one or more of the first and second aspects, the first signal, the second signal, and the third signal are associated with respective resource allocations that are known to the first node and the second node before transmission of the first signal.

In a fourth aspect, alone or in combination with one or more of the first through third aspects, the respective resource allocations are determined by one or more of the first node or the second node.

In a fifth aspect, alone or in combination with one or more of the first through fourth aspects, the respective resource allocations are determined by a base station associated with the first node or the second node.

In a sixth aspect, alone or in combination with one or more of the first through fifth aspects, the beamformed link from the first node to the second node and the beamformed link from the second node to the first node are a same link.

In a seventh aspect, alone or in combination with one or more of the first through sixth aspects, the common timing is based at least in part on a base station associated with the first node and the second node.

In an eighth aspect, alone or in combination with one or more of the first through seventh aspects, the common timing is based at least in part on positioning systems of the first node and the second node.

In a ninth aspect, alone or in combination with one or more of the first through eighth aspects, the beamformed link from the first node to the second node and the beamformed link from the second node to the first node are associated with a ProSe sidelink interface.

In a tenth aspect, alone or in combination with one or more of the first through ninth aspects, the first node and the second node comprise user equipment.

In an eleventh aspect, alone or in combination with one or more of the first through tenth aspects, the first node and the second node comprise integrated access and backhaul nodes.

In a twelfth aspect, alone or in combination with one or more of the first through eleventh aspects, performing the sidelink beam failure recovery procedure further comprises performing the sidelink beam failure recovery procedure based at least in part on failing to receive one or more of the first signal or the third signal a threshold number of times.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel. The following provides an overview of some aspects of the present disclosure:

Aspect 1: A method of wireless communication performed by a first node, comprising: transmitting, to a second node on a beamformed link from the first node to the second node, a first signal, wherein the first node and the second node are associated with common timing; determining whether a second signal, based at least in part on the first signal, is received on a beamformed link from the second node to the first node; and transmitting a third signal on the beamformed link from the first node to the second node based at least in part on receiving the second signal; or performing a sidelink beam failure recovery procedure based at least in part on determining that the second signal is not received.

Aspect 2: The method of aspect 1, wherein at least one of the first signal, the second signal, or the third signal comprise channel state information reference signals.

Aspect 3: The method of any of aspects 1-2, wherein the first signal, the second signal, and the third signal are associated with respective resource allocations that are known to the first node and the second node before transmission of the first signal.

Aspect 4: The method of aspect 3, wherein the respective resource allocations are determined by one or more of the first node or the second node.

Aspect 5: The method of aspect 3, wherein the respective resource allocations are determined by a base station associated with the first node or the second node.

Aspect 6: The method of any of aspects 1-5, wherein the beamformed link from the first node to the second node and the beamformed link from the second node to the first node are a same link.

Aspect 7: The method of any of aspects 1-6, wherein the common timing is determined based at least in part on a base station associated with the first node and the second node.

Aspect 8: The method of any of aspects 1-7, wherein the common timing is determined based at least in part on positioning systems of the first node and the second node.

Aspect 9: The method of any of aspects 1-8, wherein the beamformed link from the first node to the second node and the beamformed link from the second node to the first node are associated with a ProSe sidelink interface.

Aspect 10: The method of any of aspects 1-9, wherein the first node and the second node comprise user equipment.

Aspect 11: The method of any of aspects 1-9, wherein the first node and the second node comprise integrated access and backhaul nodes.

Aspect 12: The method of any of aspects 1-11, wherein performing the sidelink beam failure recovery procedure further comprises performing the sidelink beam failure recovery procedure based at least in part on failing to receive the second signal a threshold number of times.

Aspect 13: A method of wireless communication performed by a second node, comprising: determining whether a first signal is received from a first node on a beamformed link from the first node to the second node, wherein the first node and the second node are associated with common timing; determining whether to transmit, on a beamformed link from the second node to the first node, a second signal based at least in part on whether the first signal is received; and receiving a third signal based at least in part on the second signal; or performing a sidelink beam failure recovery procedure based at least in part on failing to receive the first signal or the third signal.

Aspect 14: The method of aspect 13, further comprising transmitting the second signal based at least in part on receiving the first signal.

Aspect 15: The method of any of aspects 13-14, wherein at least one of the first signal, the second signal, or the third signal comprise channel state information reference signals.

Aspect 16: The method of any of aspects 13-15, wherein the first signal, the second signal, and the third signal are associated with respective resource allocations that are known to the first node and the second node before transmission of the first signal.

Aspect 17: The method of aspect 16, wherein the respective resource allocations are determined by one or more of the first node or the second node.

Aspect 18: The method of aspect 16, wherein the respective resource allocations are determined by a base station associated with the first node or the second node.

Aspect 19: The method of any of aspects 13-18, wherein the beamformed link from the first node to the second node and the beamformed link from the second node to the first node are a same link.

Aspect 20: The method of any of aspects 13-19, wherein the common timing is based at least in part on a base station associated with the first node and the second node.

Aspect 21: The method of any of aspects 13-20, wherein the common timing is based at least in part on positioning systems of the first node and the second node.

Aspect 22: The method of any of aspects 13-21, wherein the beamformed link from the first node to the second node and the beamformed link from the second node to the first node are associated with a ProSe sidelink interface.

Aspect 23: The method of any of aspects 13-22, wherein the first node and the second node comprise user equipment.

Aspect 24: The method of any of aspects 13-22, wherein the first node and the second node comprise integrated access and backhaul nodes.

Aspect 25: The method of any of aspects 13-24, wherein performing the sidelink beam failure recovery procedure further comprises: performing the sidelink beam failure recovery procedure based at least in part on failing to receive one or more of the first signal or the third signal a threshold number of times.

Aspect 26: An apparatus for wireless communication at a device, comprising a processor; memory coupled with the processor; and instructions stored in the memory and executable by the processor to cause the apparatus to perform the method of one or more aspects of aspects 1-25.

Aspect 27: A device for wireless communication, comprising a memory and one or more processors coupled to the memory, the memory and the one or more processors configured to perform the method of one or more aspects of aspects 1-25.

Aspect 28: An apparatus for wireless communication, comprising at least one means for performing the method of one or more aspects of aspects 1-25.

Aspect 29: A non-transitory computer-readable medium storing code for wireless communication, the code comprising instructions executable by a processor to perform the method of one or more aspects of aspects 1-25.

Aspect 30: A non-transitory computer-readable medium storing a set of instructions for wireless communication, the set of instructions comprising one or more instructions that, when executed by one or more processors of a device, cause the device to perform the method of one or more aspects of aspects 1-25.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communication at a first node, comprising:
one or more memories; and
one or more processors, coupled to the one or more memories, configured to cause the first node to:
transmit, to a second node and on a beamformed link from the first node to the second node, a first signal; and
perform a sidelink beam failure recovery procedure based at least in part on failing to receive a second signal, associated with the first signal, a threshold number of times,
wherein the second signal includes a physical sidelink feedback channel (PSFCH) signal.

2. The apparatus of claim 1, wherein the first signal includes a channel state information reference signal (CSI-RS).

3. The apparatus of claim 1, wherein the first signal is associated with a resource allocation that is known to one or more of the first node or the second node before transmission of the first signal.

4. The apparatus of claim 3, wherein the resource allocation is known to the first node and the second node before transmission of the first signal.

5. The apparatus of claim 3,
wherein the resource allocation is a first resource allocation, and
wherein the second signal is associated with a second resource allocation that is known to one or more of the first node or the second node before transmission of the first signal.

6. The apparatus of claim 5, wherein the first resource allocation and the second resource allocation are known to the first node and the second node before transmission of the first signal.

7. The apparatus of claim 1,
wherein the first signal is associated with a first resource allocation,
wherein the second signal is associated with a second resource allocation, and
wherein one or more of the first resource allocation or the second resource allocation are determined by one or more of the first node or the second node.

8. The apparatus of claim 7, wherein the first resource allocation and the second resource allocation are determined by one or more of the first node or the second node.

9. The apparatus of claim 7, wherein one or more of the first resource allocation or the second resource allocation are known to the first node and the second node before transmission of the first signal.

10. The apparatus of claim 7, wherein the first resource allocation and the second resource allocation are known to one or more of the first node or the second node before transmission of the first signal.

11. The apparatus of claim 10, wherein the first resource allocation and the second resource allocation are known to the first node and the second node before transmission of the first signal.

12. The apparatus of claim 11, wherein the first resource allocation and the second resource allocation are determined by one or more of the first node or the second node.

13. The apparatus of claim 1, wherein the first node is a first user equipment.

14. The apparatus of claim 10, wherein the second node is a second user equipment.

15. The apparatus of claim 1, wherein the one or more processors, to perform the sidelink beam failure recovery procedure, are configured to cause the first node to perform the sidelink beam failure recovery procedure based at least in part on failing to receive the second signal the threshold number of times on one or more beamformed links between the second node and the first node.

16. The apparatus of claim 15, wherein the one or more beamformed links include the beamformed link.

17. A method of wireless communication performed by a first node, comprising:
transmitting, to a second node and on a beamformed link from the first node to the second node, a first signal; and
performing a sidelink beam failure recovery procedure based at least in part on failing to receive a second signal, associated with the first signal, a threshold number of times,
wherein the second signal includes a physical sidelink feedback channel (PSFCH) signal.

18. The method of claim 17, wherein the first signal includes a channel state information reference signal (CSI-RS).

19. The method of claim 17, wherein the first signal is associated with a resource allocation that is known to one or more of the first node or the second node before transmission of the first signal.

20. The method of claim 19, wherein the resource allocation is known to the first node and the second node before transmission of the first signal.

21. The method of claim 19,
wherein the resource allocation is a first resource allocation,
wherein the second signal is associated with a second resource allocation, and
wherein the first resource allocation and the second resource allocation are known to one or more of the first node or the second node before transmission of the first signal.

22. The method of claim 21, wherein the first resource allocation and the second resource allocation are known to the first node and the second node before transmission of the first signal.

23. The method of claim 17,
wherein the first signal is associated with a first resource allocation,
wherein the second signal is associated with a second resource allocation, and
wherein one or more of the first resource allocation or the second resource allocation are determined by one or more of the first node or the second node.

24. The method of claim 21, wherein the first resource allocation and the second resource allocation are known to one or more of the first node or the second node before transmission of the first signal.

25. The method of claim 24, wherein the first resource allocation and the second resource allocation are known to the first node and the second node before transmission of the first signal.

26. The method of claim 17, wherein performing the sidelink beam failure recovery procedure comprises performing the sidelink beam failure recovery procedure based at least in part on failing to receive the second signal the threshold number of times on one or more beamformed links between the second node and the first node.

27. A first apparatus for wireless communication, comprising:
means for transmitting, to a second apparatus and on a beamformed link from the first apparatus to the second apparatus, a first signal; and
means for performing a sidelink beam failure recovery procedure based at least in part on failing to receive a second signal, associated with the first signal, a threshold number of times,
wherein the second signal includes a physical sidelink feedback channel (PSFCH) signal.

28. The first apparatus of claim 27, wherein the first signal includes a channel state information reference signal (CSI-RS).

29. A non-transitory computer-readable medium storing a set of instructions for wireless communication, the set of instructions comprising:
one or more instructions that, when executed by one or more processors of a first node, cause the first node to:
transmit, to a second node and on a beamformed link from the first node to the second node, a first signal; and
perform a sidelink beam failure recovery procedure based at least in part on failing to receive a second signal, associated with the first signal, a threshold number of times,
wherein the second signal includes a physical sidelink feedback channel (PSFCH) signal.

30. The non-transitory computer-readable medium of claim 29, wherein the first signal includes a channel state information reference signal (CSI-RS).

* * * * *